United States Patent [19]
Critchlow et al.

[11] Patent Number: 5,659,576
[45] Date of Patent: Aug. 19, 1997

[54] BALANCED PROCESSING BASED ON RECEIVER SELECTION

[75] Inventors: David N. Critchlow; Michael Parr; Long Huynh, all of San Diego, Calif.

[73] Assignee: Hughes Electronics, Los Angeles, Calif.

[21] Appl. No.: 279,724

[22] Filed: Jul. 25, 1994

Related U.S. Application Data

[63] Continuation-in-part of Ser. No. 273,661, Jul. 11, 1994, and Ser. No. 246,851, May 19, 1994.
[51] Int. Cl.$^6$ ................... H04B 1/38; H04L 5/16
[52] U.S. Cl. .............. 375/219; 375/229; 375/233; 375/350; 375/351
[58] Field of Search ................. 375/229, 230, 375/232, 233, 234, 266, 350, 351, 219; 364/724.2; 333/18, 28 R

[56] References Cited

U.S. PATENT DOCUMENTS

| | | | |
|---|---|---|---|
| 5,195,106 | 3/1993 | Kazecki et al. | 375/230 |
| 5,436,942 | 7/1995 | Cheng et al. | 375/229 |
| 5,444,738 | 8/1995 | Ezuriko | 375/229 |
| 5,450,442 | 9/1995 | Umemoto et al. | 375/354 |

*Primary Examiner*—Stephen Chin
*Assistant Examiner*—Don Vo
*Attorney, Agent, or Firm*—Gordon R. Lindeen, III; Wanda K. Denson-Low

[57] ABSTRACT

A device and method for receiving a radio signal transmitted over a channel, selecting and deselecting an equalizer, and balancing processing in response to such selection. A radio frequency signal is received from a transmission channel into a receive path, and delay spread in the radio frequency signal is estimated using an analysis circuit. The analysis circuit also determines a threshold delay spread. In the event the estimated delay spread exceeds the threshold delay spread, an equalizer is selected, otherwise the equalizer is deselected. Similarly, in the event the estimated delay spread does not exceed the threshold delay spread, a high complexity processor is selected, otherwise a low complexity processor is selected. If the low complexity processor is selected, an output signal is generated using the low complexity processor, and if the high complexity processor is selected, the output signal is generated using the high complexity processor.

19 Claims, 8 Drawing Sheets

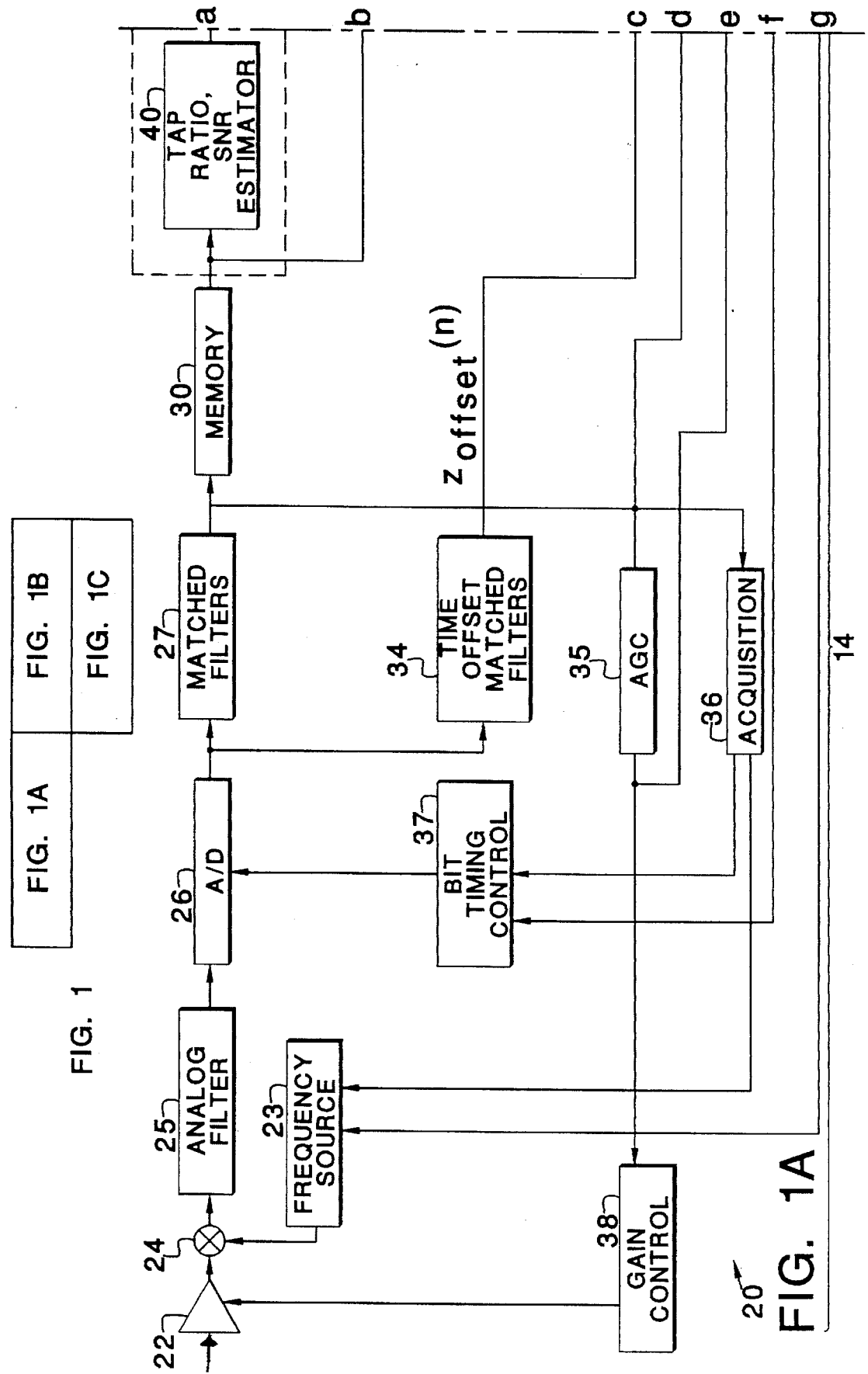

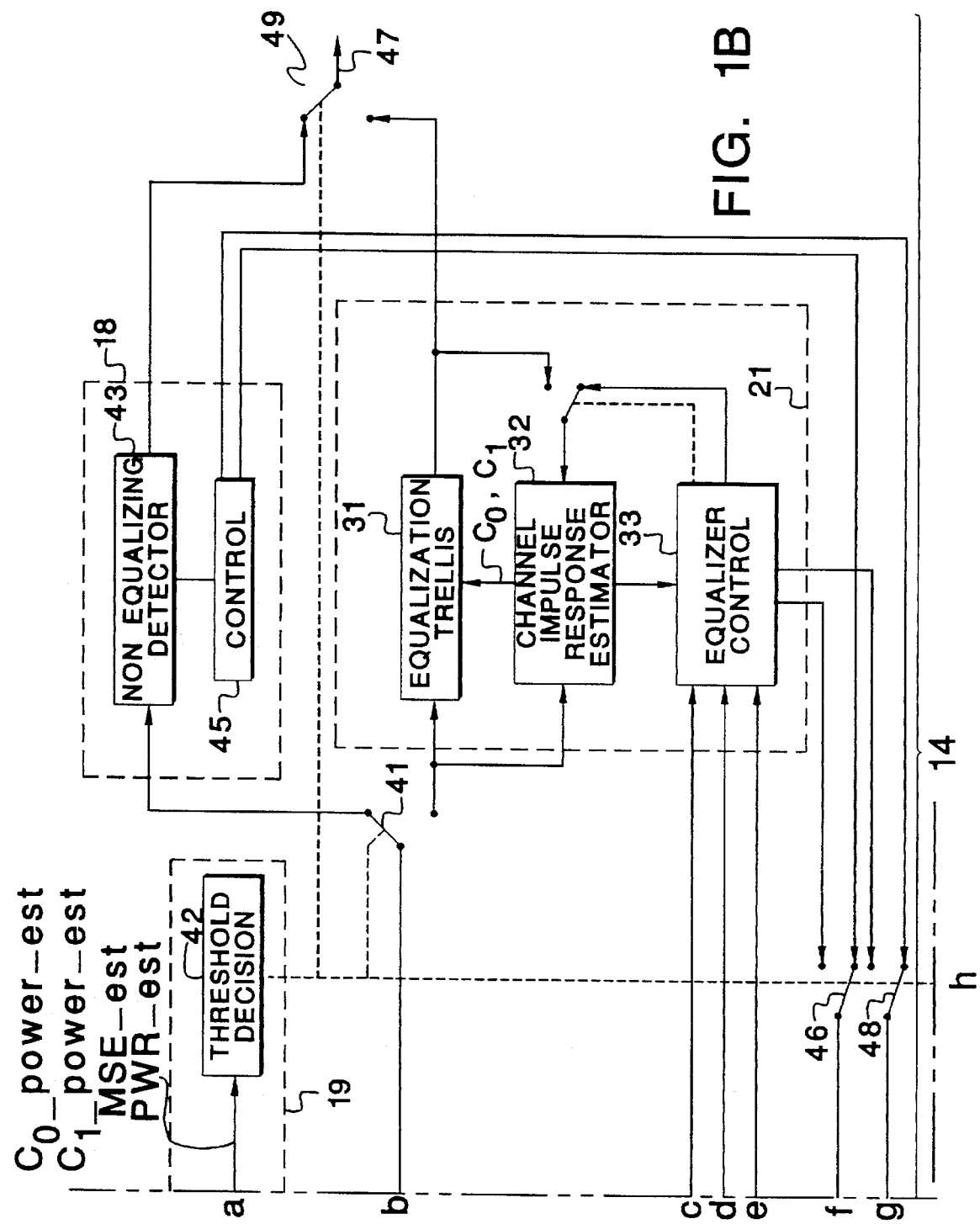

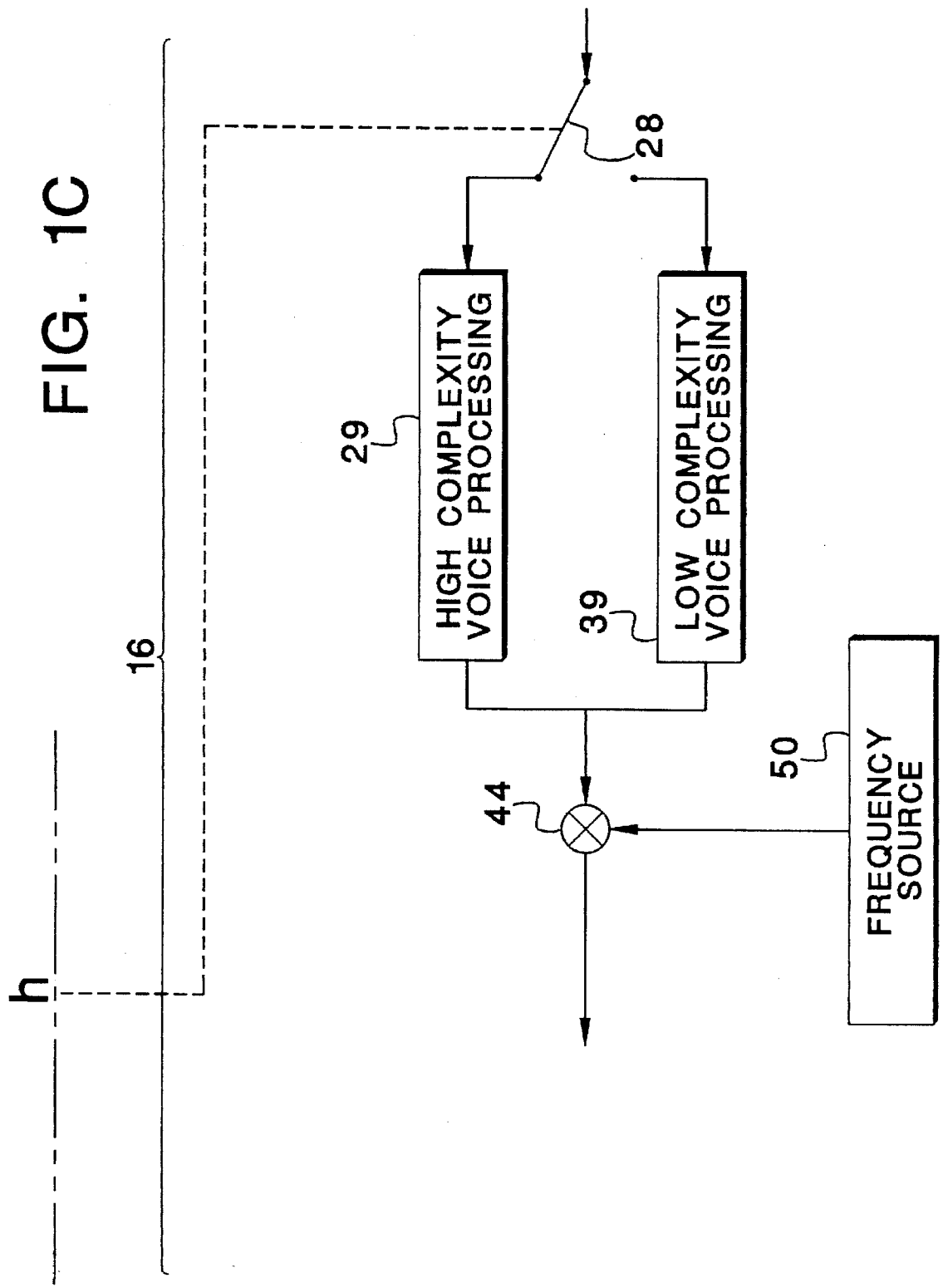

BALANCED PROCESSING BASED ON RECEIVER SELECTION

CROSS-REFERENCE TO RELATED APPLICATIONS

This application is a continuation-in-part of Applications Ser. No. 08/273,661, filed Jul. 11, 1994, entitled "Time-Reversed Infinite Impulse Response Filtering of an Asymmetric Signal", now allowed, and Ser. No. 08/246,851, filed May 19, 1994, now pending, entitled "Receiver Selection Based on Delay Spread Estimation" by Michael Parr, and Long Huynh and Michael Parr, respectively, and assigned to the assignee of the present application, the priorities of which are hereby claimed and the disclosures of which are hereby incorporated by reference fully herein.

BACKGROUND OF THE INVENTION

The present invention relates to balanced processing based on selection of a receiver, and more particularly to delay spread estimation for a radio frequency signal path, selection of a receiver equalizer based on such estimation, and balanced processing based on such selection. Even more particularly, the present invention relates to delay spread estimation of a cellular telephone signal path, selection of a receiver equalizer based on such estimation, wherein a delay spread threshold for selection of the receiver equalizer is a function of signal-to-noise ratio, and balanced voice processing based on such receiver selection.

Communication channels in the cellular environment commonly impose a combination of distorting effects on transmitted signals. Rayleigh fading, where a signal's perceived power level rises and falls rapidly over a wide range, results from the combination (interference) of signals that have traversed paths differing in length by at least a significant fraction of a wavelength (i.e., about 30 cm. for cellular). This type of interference is known as multi-path interference. Differences in path transmission times that approach the time taken to transmit a symbol result in a second problem called delay spread.

Delay spread results in reception of multiple delayed replicas of a transmitted signal. Each Rayleigh faded replica has randomly distributed amplitude and phase, and the rate at which this complex quantity varies is constrained by the Doppler bandwidth associated with a vehicle's speed. In a frequency nonselective environment, the sampled outputs of a receiver's matched filter provide uncorrelated estimates of the transmitted data. As such, in terms of discrete time samples, the channel has exhibited an impulse response proportional to a delta function. With delay spread, on the other hand, the discrete time channel impulse response is extended to introduce energy at a number of symbol times. The effect of the channel on the transmitted signal, in turn, may be viewed as the convolution of the transmitted information with the channel's impulse response. The channel, therefore, emulates a convolutional coding process (encoder).

This leads to the possibility of estimating the transmitted information through the use of methods analogous to typical decoding of convolutional codes, i.e., maximum likelihood sequence estimation techniques.

Such maximum likelihood sequence estimation techniques, when implemented in a cellular telephone receiver, provide improved performance in the receive path, when multiple replicas of the transmitted signals are received. However, when multiple replicas are not received, i.e., when the transmitted signal is received having traversed a single signal path, such maximum likelihood sequence estimation receivers actually degrade performance. Thus, it is desirable to switch between a receiver that performs maximum likelihood sequence estimation, and a receiver that does not perform such maximum likelihood sequence estimation.

Both of these receivers can be implemented using a digital signal processor. Thus it is desirable to load and execute either an equalizing receiver routine or a non-equalizing receiver routine in the digital signal processor depending on whether multi-path interference is detected. The equalizing receiver requires more processing from the digital signal processor.

For the North American digital cellular system, a number of documents define the standards of implemented components. With respect to this invention, the following are of interest: "Dual-Mode Mobile Station-Base Station Compatibility Standard" denoted here as IS-54, EIA/TIA Project Number 2398, Rev. A Jan 1991; "Recommended Minimum Performance Standards for 800 MHz Dual-Mode Mobile Stations", denoted here as IS-55, EIA/TIA Project Number 2216, Apr. 1991; and Recommended Minimum Performance Standards for Full Rate Speech Codes denoted here as IS-85, TIA/EIA, May 1992.

In accordance with these standards, a voice encoder/decoder is used to perform voice processing, or speech coding. Voice processing is not, however, specified by the above specifications with bit-exact description. Instead such voice processing is described in functional form, leaving the exact implementation of the voice processing to the designer. Thus, more complex voice processing techniques can be utilized to achieve higher quality voice output, and lower quality voice processing techniques can be utilized to achieve lower quality voice output, while still conforming to the above-mentioned standards. The higher quality voice processing techniques employ more complicated processing, and therefore require more powerful and more costly, or additional digital signal processors to implement. This is particularly true if the equalizing receiver, which also employs more complicated processing, is to be implemented simultaneously with such higher quality voice processing techniques.

The present invention advantageously provides for balanced processing, which allows for the use of higher quality voice processing (or other high complexity processing), and selection between equalizing and non-equalizing receivers, while minimizing the digital signal processing power needed. As a result, the invention also minimizes the cost required, for implementation.

SUMMARY OF THE INVENTION

The present invention advantageously provides for balanced processing within a digital signal processor based on selection of a receiver.

The present invention can be characterized as a method of selecting and deselecting an equalizer, and of balancing processing in response to such selection. The method includes (a) receiving a radio frequency signal from a transmission channel into a receive path, and (b) estimating a preselected characteristic of the transmission channel, e.g., an estimated delay spread in the radio frequency signal. The method also includes (c) determining a preselected threshold, e.g., a threshold delay spread, and (d) selecting the equalizer in the event the estimated delay spread exceeds the threshold delay spread, or (e) deselecting the equalizer in the event the estimated delay spread does not exceed the threshold delay spread. In addition, the method includes (f) selecting a high complexity processor in the event the estimated delay spread does not exceed the threshold delay spread, and (g) selecting a low complexity processor in the event the estimated delay spread exceeds the threshold delay spread. Finally, the method includes (h) generating a transmitter output signal using the low complexity processor in the event the low complexity processor is selected, or (i) generating the transmitter output signal using the high complexity processor in the event the high complexity processor is selected. When selected, the equalizer receives the radio frequency signal from the receive path, and generates the equalizer signal in response thereto.

The invention can also be characterized as a communications device for receiving a radio frequency signal transmitted over a channel. The communication device includes a radio receiver that receives the radio frequency signal from a transmission channel into a receive path, and an analysis circuit coupled to the radio receiver. The analysis circuit estimates a preselected characteristic of the transmission channel, e.g., an estimated delay spread in the radio signal, and determines a preselected threshold, e.g., a threshold delay spread. The device also includes an equalizer that equalizes the radio frequency signal and generates an equalizer signal in response thereto. The equalizer is coupled to the radio receiver. A first switching device is coupled to the analysis circuit, the equalizer and the radio receiver. The first switching device selects the equalizer in response to the analysis circuit in the event the estimated delay spread exceeds the threshold delay spread, and deselects the equalizer in the event the estimated delay spread does not exceed the threshold delay spread.

The device further includes a radio transmitter that transmits a transmitter signal from a transmission path into the transmission channel, a high complexity processor coupled to the radio transmitter, a low complexity processor coupled to the radio transmitter, and a second switching device coupled to the high complexity processor and the low complexity processor. The second switching device receives a baseband signal that is coupled by the second switching device to the high complexity processor in the event the estimated delay spread does not exceed the threshold delay spread, and is coupled to the low complexity processor in the event the estimated delay spread exceeds the threshold delay spread.

BRIEF DESCRIPTION OF THE DRAWINGS

The above and other aspects, features and advantages of the present invention will be more apparent from the following more particular description thereof, presented in conjunction with the following drawings wherein:

FIGS. 1 and 1A–1C are block diagrams of an embodiment of an apparatus made in accordance with the present invention;

Corresponding reference characters indicate corresponding components throughout the several views of the drawings.

DETAILED DESCRIPTION OF THE INVENTION

Figure 2:
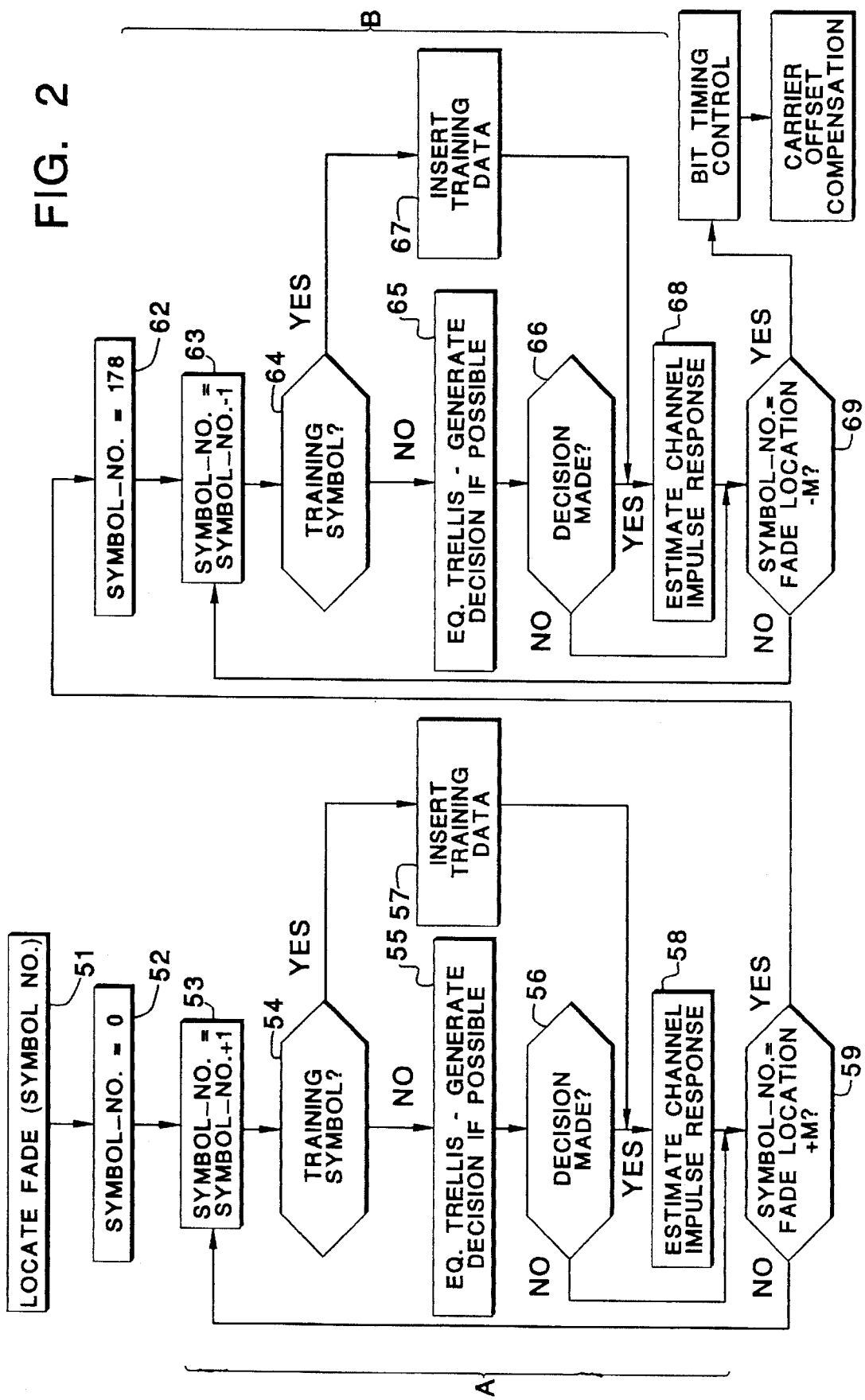
FIG. 2 is a flow chart of the steps traversed by a maximum likelihood sequence estimation equalizing receiver that can be used with the embodiment of FIG. 1.

The following description of the presently contemplated best mode of practicing the invention is not to be taken in a limiting sense, but is made merely for the purpose of describing the general principles of the invention. The scope of the invention should be determined with reference to the claims.

Referring first FIGS. 1A–1C, a block diagram is shown of an embodiment of an apparatus made in accordance with the present invention. A digital cellular mobile telephone transceiver system 20 incorporates a receive channel path 14 and a transmit channel path 16. The receive channel path 14 employs a maximum likelihood sequence estimation equalizer 21 (or equalizing receiver), a non-equalizing detector system 18 (or non-equalizing receiver), and an equalizer activation system 19. The receive channel path 14 comprises an amplifier 22 whose output is coupled by way of a down-converter (or demodulator), comprising a frequency source 23 and a mixer 24, to an analog filter 25. An analog to digital converter 26 is coupled to the analog filter 25 in order to digitize the down-converted data. A matched filter 27 is coupled between the analog to digital converter 26, and a memory 30 (or buffer). The equalizer 21 is coupled to the memory 30 via a switching device 41. The memory 30 is coupled to a common pole of the switching device 41 and the equalizer 21 is coupled to a second pole of the switching device 41. The equalizer 21 comprises a 4-state equalization trellis 31 that is adapted to calculate maximum likelihood sequence estimation metrics, a channel impulse response estimator 32, and an equalizer control circuit 33. The equalization trellis 31 is coupled to the memory 30 and is also coupled to a switching device 49 at a second pole. The channel impulse response estimator 32 is coupled to the memory 30 via the switching device 41 at its second pole, and is coupled to the switching device 49 at its second pole. The channel impulse response estimator 32 is also coupled to the equalization trellis 31, and to the equalizer control circuit 33. Both the equalizing receiver 21 and the non-equalizing receiver 18 can preferably be implemented as software routines executed on a digital signal processor (not shown). The equalizing receiver 21, when implemented as a software routine, is more complex, and therefore has greater processing requirements than the non-equalizing receiver 18, when implemented as a software routine.

Also coupled to the memory 30 via the switch 41 is the non-equalizing detector system 18. The non-equalizing detector system 18 is coupled to the switching device 41 at a first pole of the switching device 41, and comprises a non-equalizing detector 43 and a control unit 45. Suitable non-equalizing detector systems 18 are known to those skilled in the art. Several such non-equalizing detector systems 18 are shown in the reference "Digital Communications 2nd Edition", by J. G. Proakis, at, e.g., Chapter 4, 1989. The non-equalizing detector 43 is coupled to the memory 30 via the switching device 41 at its first pole, and is coupled to a receiver output 47 via another switching device 49 at its first pole. The receiver output 47 is coupled to a common pole of the switching device 49. The control unit 45 is coupled to the non-equalizing detector 43, and generates bit timing control signals and frequency control signals analogous to those generated by the equalizer control circuit 33, described hereinbelow.

The control unit 45 is coupled to the frequency source 23 via a switching device 48 and is coupled to bit timing control circuitry 37 via another switching device 46. The control unit 45 is coupled to the switching device 48 at a first pole, and the frequency source 23 is coupled to the switching device 48 at a common pole. Similarly, the control unit 45 is coupled to the switching device 46 at a first pole, and the bit timing control circuitry 37 is coupled to the switching device 46 at a common pole.

A serially coupled AGC circuit 35 and gain control circuit 38 are coupled to the amplifier 22. The equalizer control circuit 33 is coupled to an output of the analog to digital converter 26 via time offset matched filters 34 and is coupled to an input to the frequency source 23 via a second pole of the switching device 48. Symbol sampling (bit timing) time control circuitry 37 is coupled to the equalizer control circuit 33 via a second pole of the switching device 46 and provides bit timing control signals to the analog to digital converter 26. The bit timing control circuitry 37 is also coupled to the acquisition circuit 36. The output of the matched filters 27 is coupled to the AGC circuit 35 and the acquisition circuit 36 and to the equalizer control circuit 33 that is employed to control the frequency source 23 and provide training data for use in initializing the equalizer 21.

The transmit channel path 16 comprises a switching device 28, a high complexity voice processor 29, a low complexity voice processor 39, a multiplier 44 and a frequency source. A baseband data signal generated by commonly known transmitter circuits (not shown) within the cellular transceiver 20 is received into a common pole of the switching device 28. A first pole of the switching device 28 is coupled to the high complexity voice processor 29, and a second pole of the switching device 28 is coupled to the low complexity voice processor 39. The high complexity voice processor 29 provides superior quality voice output, i.e., superior in clarity and accuracy, but requires processing overhead in excess of that which is required by the low complexity voice processor 39. For example, the low complexity voice processor 39 can utilize only a portion, e.g., every other one, of the set of codebook entries specified by IS-54B and IS-85, thereby reducing the codebook lookup processing requirements of the low complexity voice processor 39 to half of what they would normally be. Furthermore, the low complexity voice processor 39 can perform other calculations specified by IS-54B and IS-85 to a lesser degree of accuracy than the high complexity voice processor 58. Each of these features of the low complexity voice processor 39 results in reduced processing overhead and reduced quality voice output.

Both the low complexity voice processor 39 and the high complexity voice processor 29 are preferably implemented as software routines that execute on the same digital signal processor (not shown) as is used to execute the software routines that implement the equalizing receiver 21 and the non-equalizing receiver 18.

Both the high complexity voice processor 29 and the low complexity voice processor 39 are coupled to and input of the multiplier 44 (or multiplexer). Another input of the multiplexer 44 is coupled to the frequency source 50, which generates a modulation frequency (or carrier frequency). Together the multiplexer 44 and frequency source 50 serve as a modulator, such as are known in the art, which modulates the output of the high and low complexity voice processors 29, 39 and prepares such output for transmission.

The equalizer activation system 19 includes a ratio/SNR estimator 40 and a threshold decision controller 42. The threshold decision controller 42 is coupled to the switching devices 41, 49, 48, 46, 28 and passes a switch control signal thereto. The switching devices 41, 49, 48, 46, 28 assume a first state or a second state in response to the switch control signal. In the first state, the switching devices 41, 49, 48, 46, 28 couple their respective common poles to their respective first poles, and in the second state they couple their respective common poles to their respective second poles.

When the switching devices 41, 49, 48, 46 are in the first state, the receiver output 47 is generated by the non-equalizing detector system 18, and when the switching devices 41, 49, 48, 46 are in the second state the receiver output 47 is generated by the equalizer 21.

When the switching device 28 is in the first state, the baseband data signal from the transmitter circuits is processed by the high complexity voice processor 29. When the switching device 28 is in the second state, the baseband data signal is processed by the low complexity voice processor 39. Thus, the high complexity voice processor 29 is used only in combination with the non-equalizing receiver 18 and the low complexity voice processor 39 is used only in combination with the equalizing receiver 21.

In this way, the higher processing demands of the equalizing receiver 21 are balanced with the lower processing requirements of the low complexity voice processor 39. Similarly, the lower processing demands of the non-equalizing receiver 18 are balanced with the higher processing requirements of the high complexity voice processor 29.

In about 90% of environments in which cellular transceivers are utilized, there will be little or no multipath interference, and therefore the high complexity voice processor 29/non-equalizing receiver 18 combination will be utilized to produce superior performance, i.e., clearer and cleaner voice output at the cellular transceiver and base station. In the approximately 10% of cases where the equalizing receiver 21 is required, the higher processing demands of the equalizing receiver 21 are accommodated by switching to the low complexity voice processor 39. As a result, the processing requirements within the cellular transceiver 20 remain relatively constant to those of the high complexity voice processor 29/non-equalizing receiver 18 combination. Thus, processing power within the digital signal processor is efficiently utilized, and system cost can be held to a minimum, i.e., the need for two digital signal processors and/or more powerful digital signal processors is eliminated.

In operation, a partially filtered RF signal with a center frequency of 85.05 MHz enters the gain controllable amplifier 22. The resulting signal is then down-converted using the frequency source 23 and the mixer 24 to 461.7 kHz. This signal is then filtered using a narrow analog filter 25 to reject most of the received signals outside the 30 kHz band of interest. The resulting signal is then sampled and converted to 8-bit digital samples using the analog to digital (A/D) converter 26. A 16-tap fractionally spaced digital FIR filter 27 then performs matched filtering to produce symbol spaced samples which enter the memory 30. Temporally offset matched filters 34 that are substantially the same as the matched filters 27 are provided for use by the symbol timing control circuit 37, via the equalizer control circuit 33.

The principles of maximum likelihood sequence estimation employed in the equalizer 21 have been described in technical literature starting in the early 1970's. A useful outline is found in "Adaptive Maximum-Likelihood Receiver for carrier-Modulated Data Transmission Systems", by G. Ungerboeck, IEEE Tran. on Communications, Vol. COM-22, at, e.g., pp. 624–636, May 1974. Another description of the maximum likelihood sequence estimation technique is provided in the reference "Digital Communications 2nd Edition", by J. G. Proakis, at, e.g., pp. 610–642, 1989.

The embodiment described herein makes use of an adaptation of the Maximum Likelihood Sequence Estimation (MLSE) equalizer described in U.S. Pat. No. 5,263,026, incorporated herein by reference. Various aspects of the '026 patent MLSE equalizer are outlined and explained herein with respect to the particular adaptation of the '026 patent utilized to implement a preferred embodiment of the present invention.

The maximum likelihood sequence estimation process is outlined as follows. The channel has an impulse response containing significant energy in, say, N symbols. Assume that the transmitter sends a sequence of symbols, much longer than N. The transmitted sequence may be described as the transitions between states, where each state corresponds to a group of N−1 transmitted symbols. The states, therefore, correspond to overlapping groups of transmitted symbols. In consecutive states, therefore, all but one constituent symbol are the same, and the possible transitions between states are correspondingly constrained. As each sample is received, the equalization trellis 31 considers every possible sequence of N symbols that could have contributed to its value, by convolving that sequence with the estimate channel impulse response. For each hypothesized sequence, the result of the convolution corresponds, or fails to correspond, in some way (defined by a statistic called a metric) to the measured sample. On an individual basis, the hypothesized sequence with the closest match to the measured sample (the best metric) is the most likely to have been transmitted. However, over many samples and under the constraint that only certain state transitions are possible, the path (sequence of states) with the minimum cumulative metric has maximum likelihood, and this is what the decoder selects.

The system 20 has no a priori knowledge of the form of the encoder characterizing the transmission channel. Performance of the equalizer 21 therefore depends on the accuracy of the estimate of the encoder's state, the channel impulse response (CIR). The objective is to estimate the form of the transversal finite impulse response filter that would take as its input the transmitted information symbols $\{a(a)\}$, and produce at its output the samples taken from the matched filter, $\{z(n)\}$. During the transmission of preambles and coded digital verification color codes, the receiver knows the values of $\{a(n)\}$. However, at other times, only the estimated values $\{a_d(n)\}$ are available for use in the channel impulse response estimation process. The dependence leads to a significant performance-degrading possibility. If decision errors emerge from the equalizer 21, and these are then used to update the estimate of the channel impulse response, then further decision errors become more probable leading in a circular fashion to further decision errors and breakdown of the equalization process. This phenomena is referred to as a "channel impulse response tracking breakdown". Such difficulties are most likely to arise at the periods of minimum signal-to-noise ratio, or when the received signal power is at its minimum during reception of a slot.

Within the IS-54 standard, which describes the interface between mobile and base equipment for North American digital cellular systems, each information time slot is preceded by a known sequence, designated as the preamble. As viewed by the receiver, therefore, information in the time slot is bounded on both sides by known sequences; the preamble for this slot and the preamble for the subsequent slot. Consequently, this equalizer 21 is adapted to mitigate the effects of a channel impulse response tracking breakdown. By finding the most probable instant at which the problem might occur, equalizer 21 operation approaches that instant from both forward and a time-reversed directions, both of which begin with known information sequences that are useful for training. Assuming that a channel impulse response tracking breakdown occurs, this approach minimizes the number of affected symbols by predicting the failure point and avoiding equalization beyond that point.

At 100 km/hr, which is the maximum speed specified in IS-55, which describes the mobile unit minimum performance requirements, the average time between fades is on the order of 12 milliseconds. Given time slot durations of about 6.7 milliseconds, there is only a small possibility of two significant fades occurring within a time slot. However, very close to the center of the slot is the coded digital verification color code field. Even after a channel impulse response tracking breakdown, the channel impulse response estimator 32 is very likely to recover during processing of the coded digital verification color codes due to the certainty of the transmitted date. Hence, the underlying period for which multiple fades are a concern is around 3.5 milliseconds. The chance of more than one deep fade occurring during this time is very low. Consequently, time-reversed equalization improves bit error rate performance in the digital cellular environment.

The equalizer 21 uses a 4-state architecture, corresponding to N=2, where N is the length of the estimated channel impulse response. This choice assumes that the energy in two (symbol-spaced) samples of the channel's impulse response dominates, To avoid channel impulse response tracking breakdown problems, reverse equalization is used for those symbols following the minimum power point in a received time slot.

More specifically, FIG. 2 shows the processing performed in the maximum likelihood sequence estimation based equalizer 21 of FIG. 1B. The first step involves finding the location of the power fade (box 51) in terms of symbol number. Processing starts in the forward direction toward the location of the power fade. The symbol number is set to 0 (box 52), and then incremented (box 53). A decision is made whether the symbol then processed is a training symbol (box 54). If the symbol encountered is a training symbol, then training data is inserted (box 57). If a training symbol is not processed, then the equalization trellis is employed to generate metrics and, if possible, a decision (box 55). This is accomplished using equations outlined below. Then it is determined if a decision has been made (box 56). If a decision has been made, then an estimate of the channel impulse response is generated (box 58). If the decision is not made, or once the channel impulse response estimate has been generated, then the symbol number is compared to the location of the power fade plus a predetermined number of additional symbols (box 59). Processing is then repeated by incrementing the symbol number (box 53) and repeating steps (boxes 54–59) until the fade location plus a predetermined number of additional symbols has been reached.

Once the desired symbol location is reached in (box 59), then processing is performed in the reverse direction starting with the preamble of the next succeeding time slot, namely symbol number 177, for example. The symbol number is set to 178 (box 62), and then decremented (Box 63). A decision is made whether the symbol then processed is a training symbol (box 64). If the symbol encountered is a training symbol, then training data is inserted (box 67). If a training symbol is not processed, then the equalization trellis is employed to generate branch metrics and a decision (box 65). This is accomplished using the equations outlined below. Then it is determined if a decision has been made (ox 66). If a decision has been made then an estimate of the channel impulse response is generated (box 68). If the decision is not made, or once the channel impulse response estimate has been generated, then the symbol number is compared to the location of the power fade less a predetermined number of additional symbols (box 69). Processing is then repeated by decrementing the symbol number (box 63) and repeating steps (boxes 64–69) until the fade location less a predetermined number of additional symbols has been reached.

More particularly, and in operation, samples entering the equalizer 21 may be identified as z(n), and the output decisions may be identified as a(n). The probability of correctness of a(n) is known with certainty the values of a(n), denoted a(n), are used by the channel impulse response estimator 32 for training. At other times, the best estimate of a(n) is the output of the traceback decision process of the equalization trellis 31, denoted ad(n).

The equalization trellis 31 operates as follows. Equalization proceeds in the forward direction from the beginning of the preamble up until M symbols after the minimum power symbol. In the reverse direction, the same occurs with processing continuing M symbols beyond the minimum power point. This overlap ensures that trace-back through the trellis in all likelihood converges to a single path by the minimum power point.

Traceback for actual decisions does not occur until the completion of the equalization process. In addition to final traceback, however, there is a need for tentative decisions during equalization, to provide data estimates for the channel impulse response estimation to remain current. A trade-off in determining these tentative decisions arises (a) because the more up-to-date the information is, the more up-to-date the channel impulse response estimate can be (remembering that the channel is far from stationary at high speeds), and (b) the higher the number of symbols that are considered before tentative decisions are made, the more accurate the decisions will be and hence, the lower the probability that errors are introduced into the channel impulse response estimation. In the case or 4-state equalization there is very little sensitivity to the number of constraining lengths of delay introduced.

Branch metrics are calculated in the equalizer 21 using the following equation:

$$r\text{ metric}[z(k),\text{app-state}(l)] = \left| z(k) - \sum_{n=0}^{1} c_N(k) \times ah(1,n) \right|^2$$

where app_state (l) represents a hypothetical state in combination with potential input data; $a_h(1,n)$ is corresponding transmitted signal (constellation point), C represents the current estimate of the channel's impulse response, and z is the measured output of the matched filter 27.

The channel estimator 32 utilizes a second order least mean square algorithm to determine the coefficients of the transversal filter 27 that is an estimate of the channel.

$$c_{S0}(k+1) = c_{S0}(k) + K_1 \left[ z(k) - \sum_{n=0}^{1} c_n(k) \times a(k-n) \right] a^*(k)$$

$$c_{S1}(k+1) = c_{S2}(k) + K_1 \left[ z(k) - \sum_{n=0}^{1} c_n(k) \times a(k-n) \right] a^*(k-1)$$

$$c_0(k+1) = c_0(k) + c_{S0}(k+1) + K_2 \left[ z(k) - \sum_{n=0}^{1} c_n(k) \times a(k-n) \right] a^*(k)$$

$$c_1(k+1) = c_1(k) + c_{S1}(k+1) +$$

$$K_2 \left[ z(k) - \sum_{n=0}^{1} c_n(k) \times a(k-n) \right] a^*(k-1),$$

where $C_0(k)$ and $C_1(k)$ are complex values of estimated channel impulse response taps, $C_{S0}(k)$ and $C_n(k)$ are complex intermediate values related to the estimated channel impulse response taps, permitting second order operation, $K_1$ and $K_2$ within these equations control the rate of adaptation, and (conversely) the sensitivity to noise and decision errors. Consequently, to minimize the error rate, a trade-off between ability to track changes the channel and degradation in performance due to imperfect input information is needed to optimize the values of $K_1$ and $K_2$. The optimal values of $K_1$ and $K_2$ vary as a function of instantaneous signal to noise ratios and thus as a function of depth of fade. Therefore, algorithms for modifying the values during each burst have been evaluated, with considerable improvement in performance relative to that achievable with constant settings.

One approach for modifying $K_1$ and $K_2$ provides good performance and is as follows:

1. Set the values of $K_1$ and $K_2$ that will apply at the symbol determined to correspond to the deepest fade; $K_1$_fade.
2. Adjust each value linearly (with preset slope—$K_1$_slope and $K_2$_slope) to reach the selected values at the fade location, using:

before forward processing—initialize $K_1 = K_1\_\text{fade} - K_1\_\text{slope.fade\_location}$ $K_2 = K_2\_\text{fade} - K_2\_\text{slope.fade\_location}$ before forward processing—initialize $K_1 = K_1\_\text{fade} - K_1\_\text{slope}.(177-\text{fade\_location})$ $K_2 = K_2\_\text{fade} - K_2\_\text{slope}.(177-\text{fade\_location})$ during processing—as each symbol is processed $K_1 = K_1 + K_1\_\text{slope}$ $K_2 = K_2 + K_2\_\text{slope}$ where $K_1$_fade is the real value of $K_1$ at the symbol with the maximum estimated fade depth, $K_2$_fade is the real value of $K_2$ at the symbol of maximum estimated fade depth, $K_1$_slope is the real increment in $K_1$ applied during processing of each symbol, $K_2$_slope is the real increment in $K_2$ applied during processing of each symbol, and fade location is the symbol number at the maximum estimated safe depth, and last_location is the symbol number of the final symbol.

Estimation of the location of the power fade entails use of the received symbols from the matched filter 27, and the settings on the AGC circuit 35 that were active during reception of those symbols., As the response of the amplifier 22 to the AGC circuit settings is effectively instantaneous, the primary delays in utilizing this information arise in the matched filter 27. This filter 27 is a linear phase filter (constant delay), so that available input information can be easily transformed into an accurate estimate of the envelope power. This envelope is averaged by a rectangular FIR filter over about ten symbol times, with very food performance.

After completion of acquisition, the carrier frequency offset should be less than 200 Hz. To operate without impairment, this offset should be on the order of 20 Hz or less. Thus, estimation of and correction for carrier offset must continue after acquisition. The method employed utilizes the fact that when frequency offset occurs, the taps of the channel impulse response will rotate consistently at a rate proportional to the offset. Changes in tap phases over fixed periods, therefore, provide an observable characteristic to apply to frequency control. Note that random phase changes, so filtering is used to extract the frequency offset. In practice, offsets of around 1000 Hz can be resolved although the maximum expected offset after acquisition is 200 Hz. The approach used is as follows:

1. During the reception of each burst, the half of that burst that does not include the deepest fade is selected for tracking. This scheme is aimed at avoidance of the very high rates of change in phase that typically accompany transitions through low signal amplitudes.

2. Two samples of each of the two estimated channel impulse response taps are recorded: just after the preamble (or leading into the postamble if the fade occurred during the first half of the slot), and 20 symbols later (or 20 symbols earlier). At a symbol rate of 24,300 symbols per second, a 100 Hz offset would result in an average rotation of 29.6 degrees during the 20 symbol period. For any rotation in excess of 180 degrees, the observed rotation would be less than 170 degrees but in the opposite direction. This aliasing could impact performance of frequency offsets above about 300 Hz. In typical operation, however, the detriment to performance resulting from such aliasing has proved minimal, due to the anti-aliasing filtering inherent in the tracking. The selection of a sampling window of 20 symbols was based on concern about this aliasing. Otherwise, a longer window would improve noise immunity.

3. From information determined during the bit timing fine tuning, the dominant tap is selected. Using the recorded settings for this tap, a phase change is calculated, yielding an estimate of the frequency offset.

4. These estimates are then filtered over many bursts to reduce the "noise" that arises primarily due to the random (zero mean) presence of Doppler offsets and Gaussian noise. The filter output provides an estimate of the carrier offset and can be used to directly update the frequency control hardware. The offset is given by:

$$f\_offset\_estimate_{k+1} = (1-K_{fo}) f\_offset\_estimate_k + K_{fo} freq\_observed$$

where freq_observed is derived from the observed phase change, the constant $K_{fo}$ controls the convergence rate of the estimation process, $f\_offset\_estimate_k$ is the estimated frequency offset at frame "k", and $K_{fo}$ is a constant controlling the convergence rate of the frequency tracking. F_offset_ estimate reaches half the resolution of the frequency source, then a step in frequency is applied, e.g., if the resolution is 20 Hz and f_offset_estimate exceeds 10 Hz, then a 20 Hz change in reference is applied. At the same time f_offset_ estimate is reinitialized.

Figure 3:
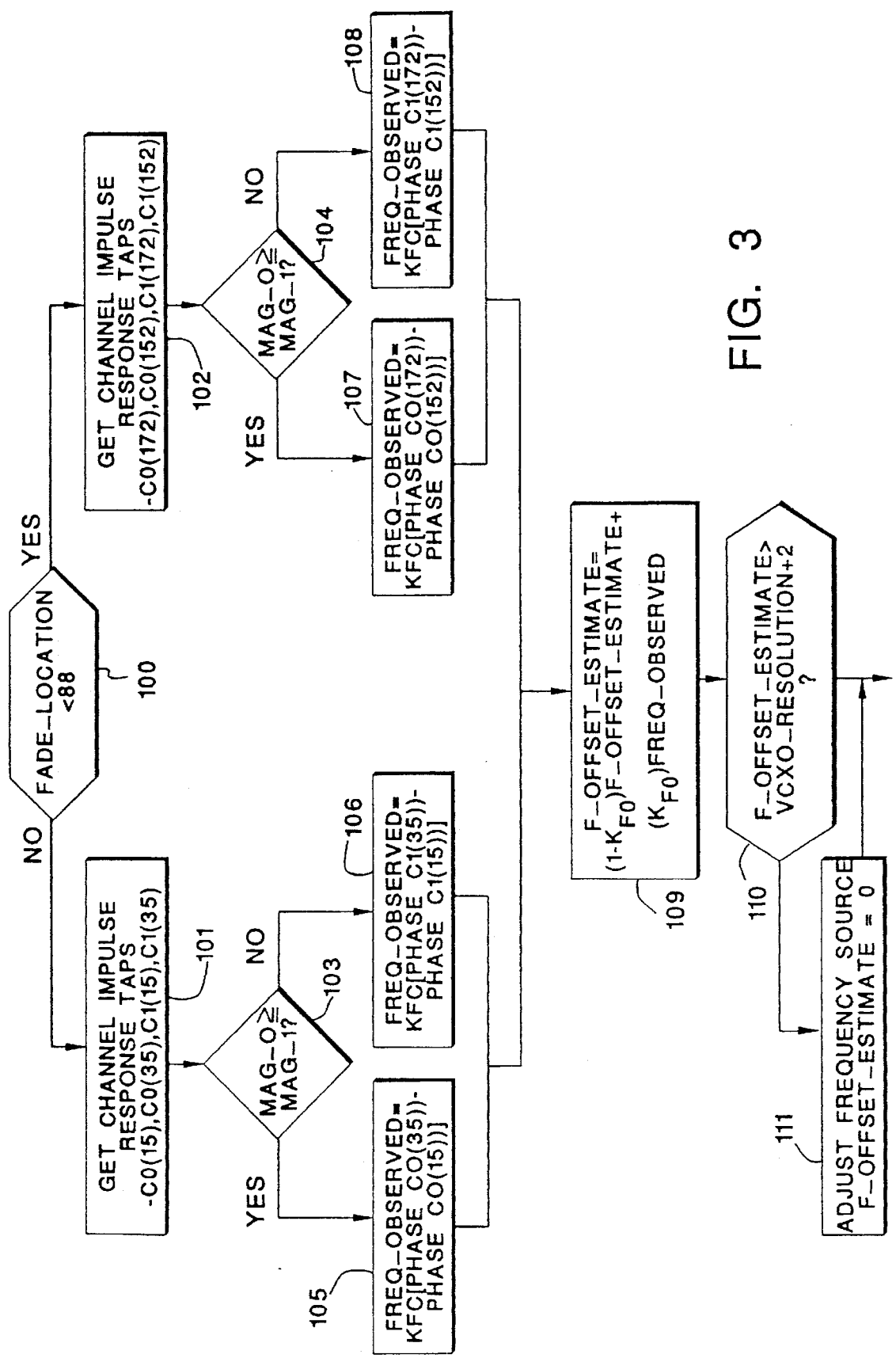
FIG. 3 is a flow chart of the steps traversed by the maximum likelihood sequence estimation equalizing receiver of FIG. 2 in order to implement carrier frequency offset compensation.

Referring to FIG. 3, a flow diagram is shown of the processing performed by the equalizer 21 to implement carrier frequency offset compensation. Utilizing an already located fade, a decision (box 100) is made as to whether to use the first or second half of the received slot for frequency offset estimation. Based on this decision, samples are taken twenty symbols apart in the appropriate half of the slot (boxes 101, 102). For the selected case, individual taps are compared and the larger is chosen (decisions 103, 104). The phases of the chosen tap at the selected two times are then subtracted (boxes 105–108) to produce "freq_observed", a noisy estimate of the offset. This is filtered (box 109) to generate an accurate estimate of the offset. If an adjustment in setting of the frequency control would reduce this offset, then a decision is made to do so (decision 110); and the decision is then implemented (box 111).

The equalizer 21 is reasonably insensitive to errors in bit timing. However, for the following reasons, symbol timing adjustments continue during equalizer operation. The initial estimate produced by acquisition may differ sufficiently from optimal timing so that performance would benefit from adjustment. The transmit and receive symbol timing clocks may differ by about 5 ppm, resulting in drift of about 0.1 µS per frame (per a symbol every 8 seconds). This drift must be compensated for. In practice, individual independently-delayed signal paths will randomly rise and diminish in average strength, resulting in situations that would be best catered for by different symbol timing. Optimal symbol timing depends on an ability to track these changing situations.

The operation of the symbol timing control is as follows. The approach has similarities to the early-late gating schemes frequently employed in direct-sequence spread spectrum receivers. As each burst is received, a measure of the error between the expected preamble and the actual received preamble is generated. In addition, in alternating frames, similar measures are made on time advanced and retarded versions of the same input samples. If no timing adjustment is necessary, the error generated with the existing timing should be less (on average) than either of the others. Adjustments are made when this is not the case or there is a consistent disparity between the advanced and retarded error estimates. This process is simply a search for bit timing that minimizes the error statistic.

The control loop used includes an estimator of any consistent change in timing, corresponding to drift with respect to the transmitter. Drift in the order of 10 ppm can be compensated for by this loop.

This search for a minimum may be hampered by the possible presence of a local (non-global) minimum. In fact, for this statistic the presence of two minima is common. The approach taken to resolve this conflict is as follows. The more advanced minimum is presumed to be the preferred sampling time. Multiple minima typically arise when there is a small level of delay spread, i.e., less than about 10 µS. Under such conditions the ratio of magnitudes of the estimated paths in the (symbol-spaced) channel impulse response differs significantly in the region of the more advanced minimum from that in the more retarded case. Thus, the ratio of tap magnitudes provides a statistic from which to conclude the appropriateness of a selected minimum.

Figure 4A:
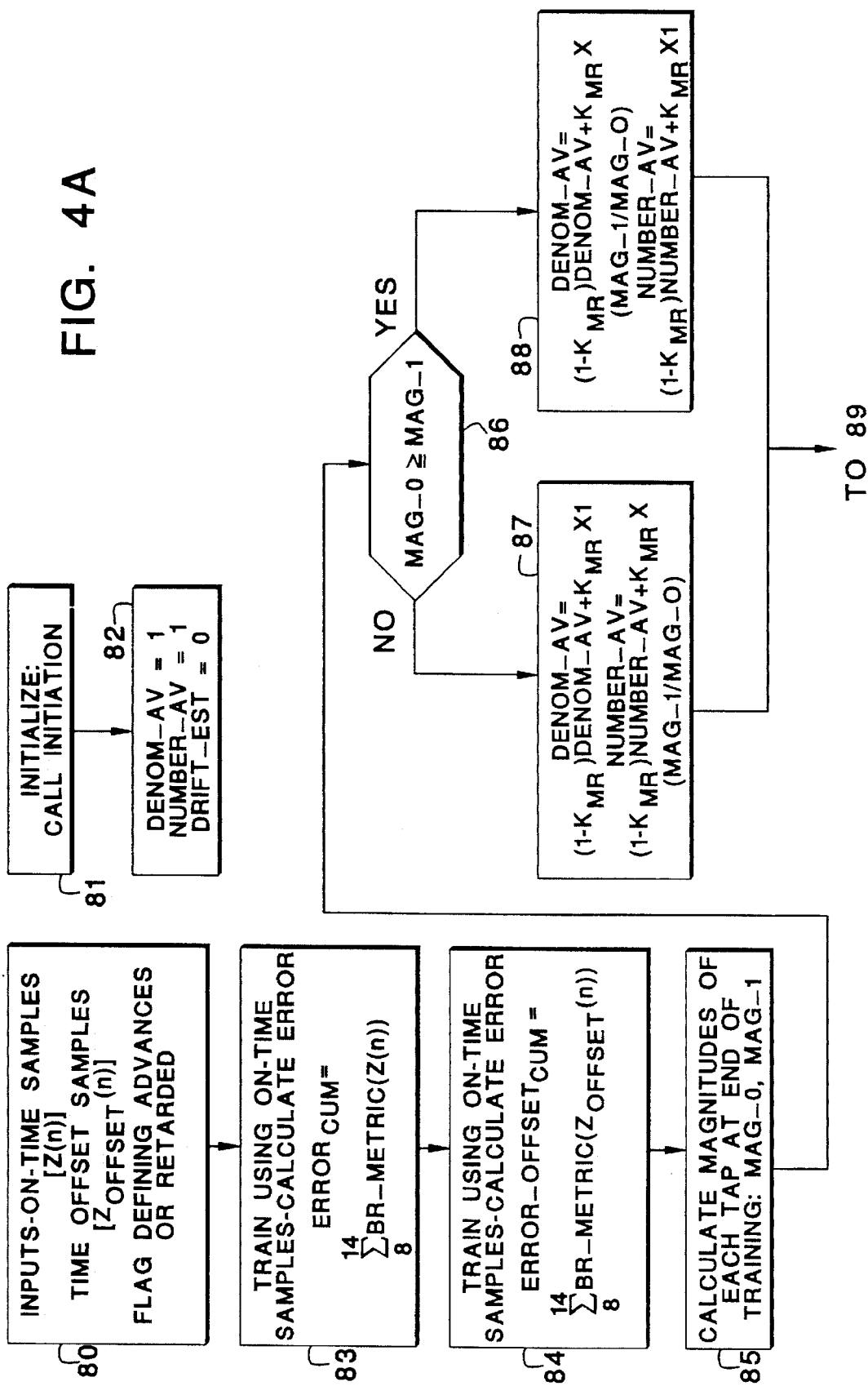
FIG. 4A and 4B flow charts of the steps traversed by the maximum likelihood sequence estimation equalizing receiver of FIG. 2 in order to implement bit timing.
Figure 4B:
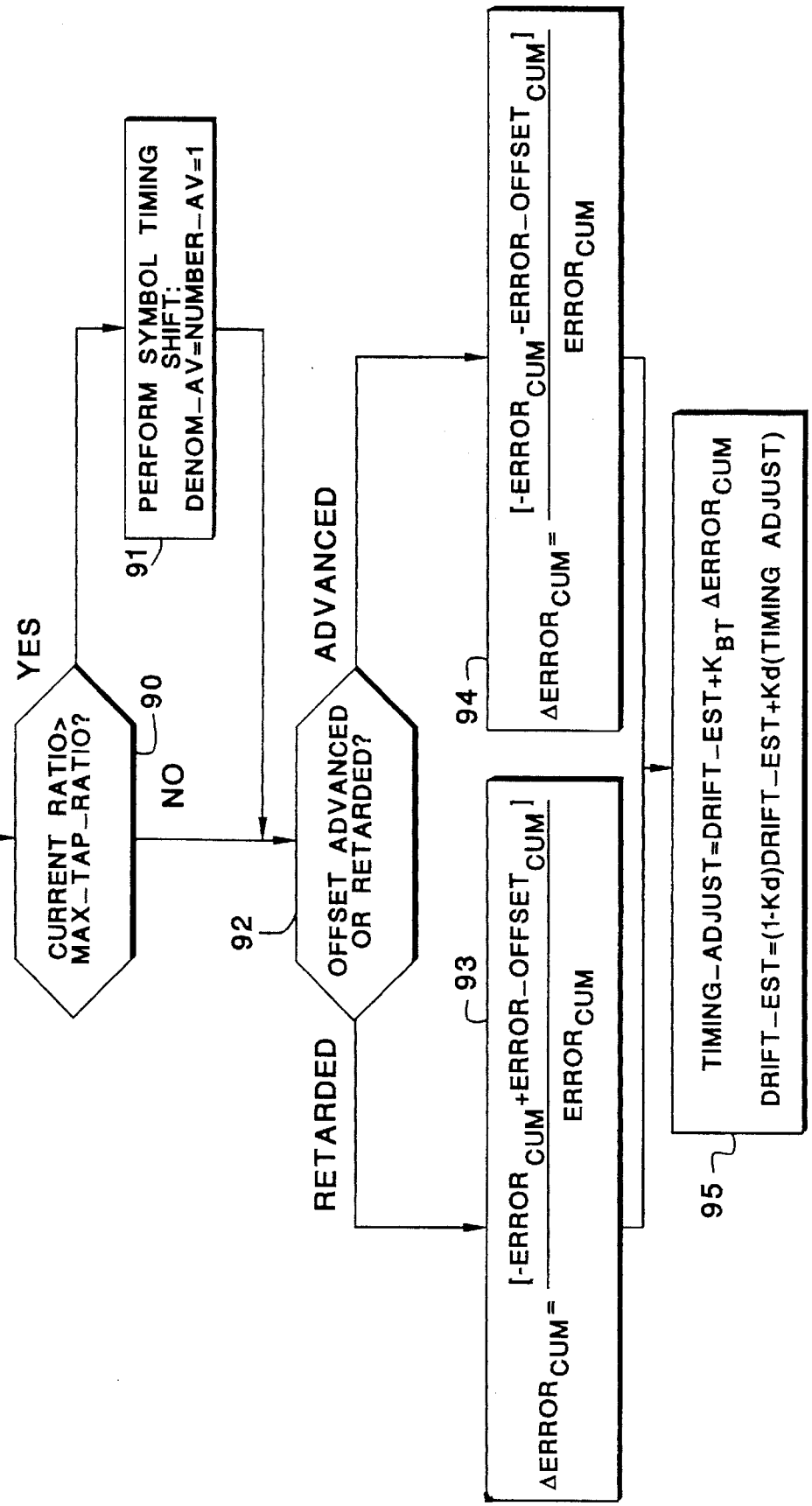

With reference to FIGS. 4A and 4B, they show flow diagrams illustrating the processing performed by the equalizer 21 to implement bit timing control. Inputs (ox 80) include the on-time and time-offset samples (z(n) and z offset (n)), and a flag to indicate the direction of the offset. The on-time samples are fed into the equalizer 21 just as they are during normal training 83. Similarly, the time offset samples are fed to the equalizer 21 (box 84). In both cases, the branch metrics (on the known correct paths) are accumulated over the latter symbols to provide measures (ERROR$_{cum}$ and ERROR OFFSET$_{cum}$) of the degree to which the samples match expectations.

In a separate process the magnitudes of each of two taps estimated and the channel impulse response at the end of the training process are calculated (box 85). Averaging the ratio of these taps over a number of frames (boxes 86–89) permits a judgment to be made as to whether the bit timing has selected an inappropriate local minimum. If a threshold (box 90) is reached, then bit timing will be advanced by a full symbol time (box 91). Taking account of the relative time at which samples were taken (box 92), the ERROR$_{cum}$ and ERROR OFFSET$_{cum}$ measures are combined to generate a noisy estimate of an appropriate timing adjustment (boxes 93, 94). This estimate is then filtered (box 95) to generate an actual timing offset adjustment. To compensate for consistent drift, an additional term "drift_est" monitors and compensates for this effect.

Referring back to FIG. 1, the ratio/SNR estimator 40 estimates the complex estimated channel impulse response tap values $C_0(k)$, $C_1(k)$. Note that the estimated channel impulse response tap values $C_0(k)$, $C_1(k)$ are generated by the ratio/SNR estimator 40 in the same way they are generated by the channel impulse response estimator 32, except that they are generated only in response to the preamble for each time slot, which is a known sequence of symbols. At the same time, signal to noise ratio (SNR) is estimated by the ratio/SNR estimator 40 by finding the ratio of signal power (PWR) to mean-square-error (MSE) during the sync. pattern (under the assumption that the transmission channel consisted of two symbol-spaced paths). That is, where PWR and MSE could be calculated as follows:

$$PWR = \frac{1}{N_s} \sum_{k=1}^{N_s} |z(k)|^2$$

$$MSE = \frac{1}{N_s} \sum_{k=1}^{N_s} \left| z(k) - \sum_{n=0}^{1} c_n \cdot sync(k-n) \right|^2$$

where; $N_s$ is the number of samples in the 'sync' pattern (14 for IS-42) sync(1) through sync $N_s$ are the (complex) elements of the 'sync' pattern; Z(k) are the complex samples stored at the output of the matched filter. Note that "noise" in this context can consist of either background noise (EG thermal) or uncorrelated interference (such as a co-channel signal intended for another cellular transceiver in another cell).

Note that $C_0$ typically represents a dominant path, and $C_1$ typically represents secondary paths.

The ratio/SNR estimator 40 determines the ratio of the dominant path's power amplitude $C_0$ to the secondary path's power amplitude $C_1$. This ratio is referenced to herein as the path ratio, and is indicative of the amount of delay spread in the radio frequency signal. If the ratio of power amplitudes falls below approximately a fixed threshold of 22 dB (i.e., 22 dB±1 dB), then the threshold decision controller 42 activates (or selects) the equalizer 21 by controlling the switching devices 41, 49, 48, 46 to assume their second states, wherein the common poles are coupled to the second poles. Similarly, if the ratio of power amplitudes rises above approximately a fixed threshold of 22 dB (i.e., 22 dB±1 dB), then the threshold decision controller 42 deactivates (or deselects) the equalizer 21 by controlling the switching devices 41, 49, 48, 46 to assume their first states, wherein the common poles is coupled to the first poles.

Thus, the equalizer 21 is activated in response to the ratio of power amplitudes falling below about 22 dB, which is indicative of increased fading or delay spread in the received cellular telephone radio frequency signal. In addition, the equalizer 21 is deactivated in response to the ratio of power amplitudes rising above about 22 dB, which is indicative of decreased fading or delay spread in the received cellular telephone radio frequency signal.

Figure 5:
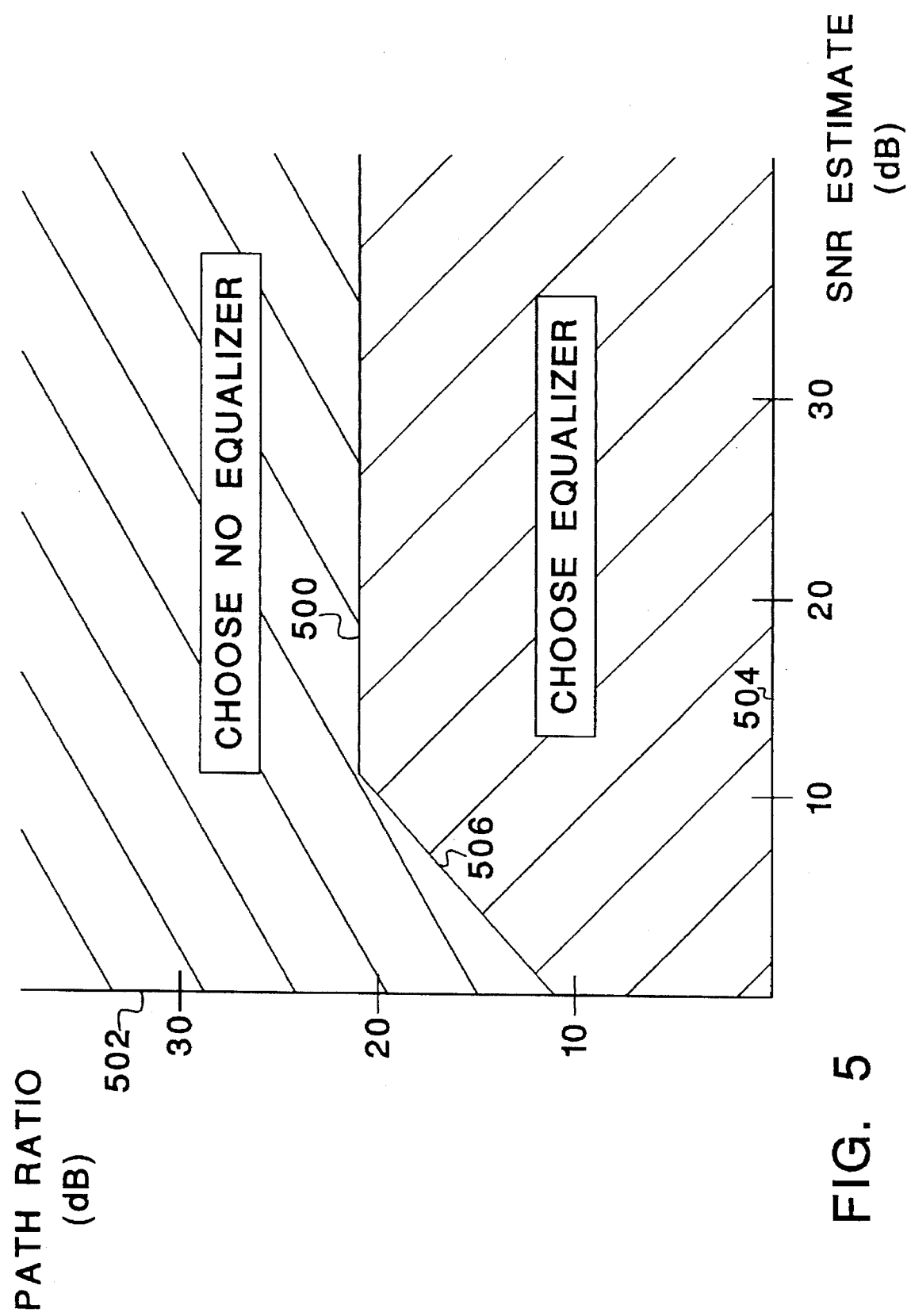
FIG. 5 are graphs showing an exemplary threshold delay spread used in the embodiment of FIG. 1 to determine whether the maximum likelihood sequence estimation equalizing receiver or a non-equalizing receiver should be utilized.

Referring next to FIG. 5, a graph is shown of an exemplary variable threshold for activation and deactivation (selection or deselection) of the equalizer 21. As described above, the graph illustrates that the equalizer 21 is activated (and the low complexity voice processor 39 is also activated) whenever the ratio of power amplitudes $C_0$, $C_1$ (or ratio of channel impulse response tap values) falls below about 22 dB. The magnitude of this 22 dB threshold 500 is illustrated along the vertical or (ordinate) axis 502. However a third factor, the signal to noise ratio (SNR), is shown as also affecting this threshold. The SNR is shown on a horizontal (or abscissa) axis 504.

In the event the channel consists of only a single path, i.e., the cellular telephone radio frequency signal is not scattered into multiple paths, the magnitude of the secondary paths' estimated power amplitude $C_1$ will increase if the SNR is decreased. This occurs even though there are in fact no significant secondary paths. Consequently, the ratio of power amplitudes $C_0$, $C_1$ will decrease below the 22 dB fixed threshold 500, even though the channel consists of only the single path. Thus, in accordance with the present embodiment, the threshold 506 is lowered in response to low SNR conditions, i.e., as a function of low SNR. As shown in FIG. 5 the threshold 506 is lowered in response to a decreased SNR after the SNR reaches about 11 dB. As the SNR approaches 0 dB, the threshold 506 is lowered to approximately 11 dB, about half of the 22 dB fixed threshold 500.

Thus, the threshold 500, 506 utilized to determine whether or not to activate the equalizer 21 varies as a function of the SNR at low SNR levels. As a result, this embodiment is able to accurately determine whether to activate or deactivate the equalizer 21 even in high noise conditions.

Furthermore, applying about 1 dB of hysteresis between actual thresholds ensures that switching between modes (activated and deactivated) is not too erratic (without significantly impacting the location of the thresholds).

Finally, note that the complex power amplitude $C_0$, $C_1$ (channel impulse response tap values) can be estimated by averaging over a number of received frames so as to avoid excessive and/or erroneous activation and deactivation of the equalizer 21. Such estimates are shown below:

$C_0$_power_est=$(1-Kc).C_0$_power_est+$Kc.|C_0|^2$ $C_1$_power_est=$(1-Kc).C_1$_power_est+$Kc.|C_1|^2$ The signal power (PWR) and the mean-squared-error (MSE) can also be estimated over several received frames:

PWR_est=$(1-Kp)$.PWR_est+$Kp$.PWR

MSE_est=$(1-Km)$.MSE_est+$Km$.MSE where the constants Kc, Kp, and Km determine the time-constant of the individual first-order averagers; and $C_0\_power\_est$, $C_1\_power\_est$, $PWR\_est$, and $MSE\_est$ are the filtered estimates of each needed quantity.

Thus the present invention provides for the selection of a receiver (i.e., equalized or not equalized) based on the threshold delay spread, which is a function of the signal-to-noise ratio of an incoming telephone signal.

While the invention herein disclosed has been described by means of specific embodiments and applications thereof, numerous modifications and variations could be made thereto by those skilled in the art without departing from the scope of the invention set forth in the claims. For example, the equalizer 21 need not be a maximum likelihood sequence estimation based equalizer, but may be any of a number of known types of equalizers, e.g., linear equalizers and decision feedback equalizers (DFEs). Moreover, the present invention can also be utilized to balance processing between the equalizing receiver 21 and non-equalizing receiver 18, and other signal processors or processing functions of the digital signal processor. Such other processors or other processing functions can be balanced with the equalizing receiver 21 and non-equalizing receiver 18 instead of, or in addition to, the high and low complexity voice processors 29, 39 described above. For example, the present invention could be utilized to balance processing between the equalizing receiver 21 and non-equalizing receiver 18, and high and low complexity processors for data decoding during data transfers in a system that transmits digital data instead of compensated voice. Such systems are planned for future application of IS-54.

What is claimed is:

1. In a digital communications system for receiving a radio frequency signal transmitted over a transmission channel and for transmitting a transmitter output signal to the transmission channel, a method of selecting and deselecting an equalizer, and for balancing processing in response to such selection, the method including:

receiving the radio frequency signal from the transmission channel into a receive path;

determining whether a preselected characteristic of the transmission channel exceeds a preselected threshold;

selecting the equalizer in the event the preselected characteristic of the transmission channel exceeds the preselected threshold;

deselecting the equalizer in the event the preselected characteristic of the transmission channel does not exceed the preselected threshold;

selecting a high complexity processor in the event the equalizer is deselected;

selecting a low complexity processor in the event the equalizer is selected;

generating the transmitter output signal using the low complexity processor in the event the low complexity processor is selected; and generating the transmitter output signal using the high complexity processor in the event the high complexity processor is selected.

2. The method of claim 1 further including:

estimating an estimated delay spread in the radio frequency signal;

determining a threshold delay spread, wherein said selecting of said equalizer includes selecting said equalizer in the event the estimated delay spread exceeds the threshold delay spread, and wherein said deselecting of said equalizer includes deselecting said equalizer in the event the estimated delay spread does not exceed the threshold delay spread;

generating a receiver output signal in response to an equalizer signal generated by the equalizer in the event the equalizer is selected, the equalizer receiving the radio frequency signal from the receive path, and generating the equalizer signal in response thereto; and generating the receiver output signal in response to the radio frequency signal from the receive path in the event the equalizer is deselected.

3. The method of claim 2 wherein the selecting of said high complexity processor includes selecting a high complexity voice processor in the event the estimated delay spread does not exceed the threshold delay spread, and the selecting of said low complexity processor includes selecting a low complexity voice processor in the event the estimated delay spread exceeds the threshold delay spread.

4. The method of claim 3 wherein the receiving of said radio frequency signal includes digitizing the radio frequency signal so as to generate samples, and wherein the generating of said receiver output signal includes:

storing sequentially a plurality of said samples, the plurality of said samples being received during a time slot;

estimating a sample within the plurality of said samples at which a data value estimate error is most probable;

processing the plurality of said samples, having been stored, starting with a first received sample in the time slot and proceeding in a forward direction with respect to the sequence in which the samples were stored, beyond the estimated sample within the plurality of said samples, at which the data value estimate error is most probable, using a maximum likelihood sequence estimation procedure to generate estimates of the values of the samples;

processing the plurality of said samples, having been stored, starting with a last received sample in the time slot and proceeding in a reverse direction with respect to the sequence in which the samples were stored, beyond the estimated sample within the plurality of said samples at which the data value estimate error is most probable, using the maximum likelihood sequence estimation procedure to generate estimates of the values of the samples; and processing the estimates of the values of the samples to generate enhanced estimates of the values of the samples.

5. The method of claim 4 wherein the step of processing the estimates comprises generating transmission channel impulse response estimates for use in generating enhanced estimates.

6. The method of claim 5 wherein said estimating of said estimated delay spread includes determining a ratio of said transmission channel impulse response estimates.

7. The method of claim 6 wherein the step of generating said transmission channel impulse response estimates comprises using variable tap coefficients that are determined by estimating tap settings for said transmission channel impulse response estimates by minimizing the square of the difference between actual received samples and those synthesized by passing known transmitted signals through the transmission channel, and wherein the generating is done in an iterative manner by combining previous transmission channel impulse response estimates with new estimates thereof based on recent estimates, and by varying the ratio of the contributions from the previous and new estimates as a function of location within said time slot.

8. The method of claim 2 wherein said determining of said threshold delay spread includes:

determining said threshold delay spread as a function of a signal to noise ratio of said radio frequency signal.

9. The method of claim 8 wherein said determining of said threshold delay spread includes:

determining said threshold delay spread as a function of said signal to noise ratio, wherein said threshold delay spread is substantially constant when said signal to noise ratio is greater than a prescribed signal to noise ratio level and said threshold delay spread decreases as a function of decreasing signal to noise ratio when said signal to noise ratio is less than the prescribed signal to noise ratio level.

10. The method of claim 2 wherein the receiving of said radio frequency signal includes digitizing the radio frequency signal so as to generate samples, and said generating of said receiver output signal includes:

storing sequentially a plurality of said samples, the plurality of said samples being received during a time slot;

estimating a sample within the plurality of said samples at which a data value estimate error is most probable;

processing the plurality of said samples, having been stored, starting with a first received sample in the time slot and proceeding in a forward direction with respect to the sequence in which the samples were stored, beyond the estimated sample within the plurality of said samples at which the data value estimate error is most probable, using a maximum likelihood sequence estimation procedure to generate estimates of the values of the samples;

processing the plurality of said samples, having been stored, starting with a last received sample in the time slot and proceeding in a reverse direction with respect to the sequence in which the samples were stored, beyond the estimated sample within the plurality of said samples at which the data value estimate error is most probable, using the maximum likelihood sequence estimation procedure to generate estimates of the values of the samples; and processing the estimates of the values of the samples to generate enhanced estimates of the values of the samples.

11. A digital communications system for receiving a radio frequency signal transmitted over a transmission channel and for transmitting a transmitter signal to the transmission channel, said digital communication receiver including:

a radio receiver that receives the radio frequency signal from the transmission channel into a receive path;

an analysis circuit coupled to the radio receiver, the analysis circuit estimating a preselected characteristic of the transmission channel, and determining a preselected threshold;

an equalizer coupled to the radio receiver, the equalizer equalizing the radio frequency signal and generating an equalizer signal in response thereto;

a first switching device coupled to the analysis circuit, the equalizer and the radio receiver, the first switching device selecting the equalizer in response to the analysis circuit in the event the preselected characteristic exceeds the preselected threshold, and deselecting the equalizer in the event the preselected characteristic does not exceed the preselected threshold;

a receiver output coupled to the first switching device, the receiver output generating a receiver output signal in response to the equalizer signal from the equalizer in the event the equalizer is selected, the receiver output generating the receiver output signal in response to the radio frequency signal from the receive path in the event the equalizer is deselected;

a radio transmitter that transmits the transmitter signal from a transmission path into the transmission channel;

a high complexity processor coupled to the radio transmitter;

a low complexity processor coupled to the radio transmitter;

a second switching device coupled to the high complexity processor and the low complexity processor, and receiving a baseband signal, the baseband signal being coupled by the second switching device to the high complexity voice processor in the event the preselected characteristic does not exceed the preselected threshold, and being coupled to the low complexity processor in the event the preselected characteristic exceeds the preselected threshold.

12. The digital communications receiver of claim 11 wherein said preselected characteristic is delay spread, and said preselected threshold is a threshold delay spread.

13. The digital communications receiver of claim 12 wherein the high complexity processor includes a high complexity voice processor and wherein the low complexity processor includes a low complexity voice processor.

14. The digital communications receiver of claim 12 wherein the digital communications system includes:

a digitizer coupled between the receiver, and the analysis circuit and equalizer, the digitizer digitizing the radio frequency signal so as to generate samples;

a memory device coupled to the digitizer, the memory device sequentially storing a plurality of said samples, the plurality of said samples being received during a time slot;

said analysis circuit estimating a sample within the plurality of said samples at which a data value estimate error is most probable;

said analysis circuit processing the plurality of said samples, having been stored, starting with a first received sample in the time slot and proceeding, in a forward direction with respect to the sequence in which the samples were stored, beyond the estimated sample within the plurality of said samples at which the data value estimate error is most probable, using a maximum likelihood sequence estimation procedure to generate estimates of the values of the samples;

said analysis circuit processing the plurality of said samples, having been stored, starting with a last received sample in the time slot and proceeding, in a reverse direction with respect to the sequence in which the samples were stored, beyond the estimated sample within the plurality of said samples at which the data value estimate error is most probable, using the maximum likelihood sequence estimation procedure to generate estimates of the values of the samples; and said analysis circuit processing the estimates of the values of the samples to generate enhanced estimates of the values of the samples.

15. The digital communications receiver of claim 14 wherein said analysis circuit generates transmission channel impulse response estimates for use in generating enhanced estimates.

16. The digital communications receiver of claim 15 wherein said analysis circuit determines a ratio of said transmission channel impulse response estimates in order to estimate said estimated delay spread.

17. The digital communications receiver of claim 16 wherein said analysis circuit generates the channel impulse response estimates using variable tap coefficients that are determined by said analysis circuit estimating tap settings for said transmission channel impulse response estimates by minimizing the square of the difference between actual received samples and those synthesized by passing known transmitted signals through a transmission channel, and wherein the processing by said analysis circuit is done in an iterative manner by combining previous transmission channel impulse response estimates with new estimates thereof based on recent estimates, and by said analysis circuit varying the ratio of the contributions from the previous and new estimates as a function of location within said time slot.

18. The digital communications receiver of claim 12 wherein said analysis circuit determines said threshold delay spread as a function of a signal to noise ratio of said receive signal.

19. The digital communications receiver of claim 18 wherein said threshold delay spread is substantially constant when said signal to noise ratio is greater than a prescribed signal to noise ratio level and said threshold delay spread decreases as a function of decreasing signal to noise ratio when said signal to noise ratio is less than the prescribed signal to noise ratio level.

* * * * *